United States Patent
Gudelio

(10) Patent No.: US 7,870,693 B1
(45) Date of Patent: Jan. 18, 2011

(54) SYSTEM FOR SHINGLE TILE ROOF PROTECTION

(76) Inventor: Piñero Gudelio, 465 NW. 25 Ave., Miami, FL (US) 33125

( * ) Notice: Subject to any disclaimer, the term of this patent is extended or adjusted under 35 U.S.C. 154(b) by 107 days.

(21) Appl. No.: 11/971,681

(22) Filed: Jan. 9, 2008

(51) Int. Cl.
*E04B 7/00* (2006.01)
*E04B 1/34* (2006.01)

(52) U.S. Cl. .................................. 52/23; 52/3
(58) Field of Classification Search ............... 52/3, 52/4, 23, DIG. 12, 12
See application file for complete search history.

(56) References Cited

U.S. PATENT DOCUMENTS

| | | | | |
|---|---|---|---|---|
| 5,570,545 | A | * | 11/1996 | Adams ........................ 52/23 |
| 5,791,090 | A | * | 8/1998 | Gitlin et al. .................... 52/4 |
| 6,273,385 | B1 | * | 8/2001 | Hambleton ................. 248/304 |
| 2007/0028528 | A1 | * | 2/2007 | McBrian ......................... 52/3 |
| 2009/0045310 | A1 | * | 2/2009 | Koesema, Jr. ............. 248/316.7 |

* cited by examiner

*Primary Examiner*—Richard E Chilcot, Jr.
*Assistant Examiner*—Andrew J Triggs
(74) *Attorney, Agent, or Firm*—Sanchelima & Associates, P.A.

(57) ABSTRACT

A system for protecting tile roofs that includes a wire mesh assembly that substantially covers the shingle tile roof structure. The wire mesh assembly includes peripheral sides defined by outermost wire members. Strap members with some degree of deformability have two folded ends. One of the ends hooks over the outermost wire member and the other end removably mounts to the distal peripheral end of the drip guard. The system can be readily deployed over the roof structure and removed for volumetrically efficient storage.

2 Claims, 3 Drawing Sheets

SYSTEM FOR SHINGLE TILE ROOF PROTECTION

BACKGROUND OF THE INVENTION

1. Field of the Invention

The present invention relates to a system and method for roof tile protection, and more particularly, to a system for preventing wind damage to a building's tile roof.

2. Description of the Related Art

Hurricanes and other high wind conditions exert uplift forces on the roof surfaces that typically affect first the roof tiles mounted thereon. It has been found that by applying a uniform force of a predetermined magnitude over the tiles, the latter are capable of withstanding the most common high wind conditions.

Applicant believes that one of the closest reference corresponds to U.S. publication No. 2007/0028528 A1 issued to McBrian for a "Roof Covering Securing System and Apparatus". McBrian's solution utilizes interlocking securing devices with interlocking loops and hooks, and, also, a boundary portion having a weight attached to secure it to the roof.

The present invention, however, is a structure made of nonperishable material with securing straps that are mounted on the perimeter of a roof. The straps are readily installed, without requiring any special tools. The straps cooperate with the side ends of a wire mesh and the drip guard to hold the tiles in place.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a system for protecting tile roofs.

It is another object of this invention to provide a system for covering roof tiles that can be readily deployed without using other fastening means such as nails or screws.

It is still another object of the present invention to provide a system for protecting tile roofs that can be easily stored and it is volumetrically efficient.

It is yet another object of this invention to provide such a system and method that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
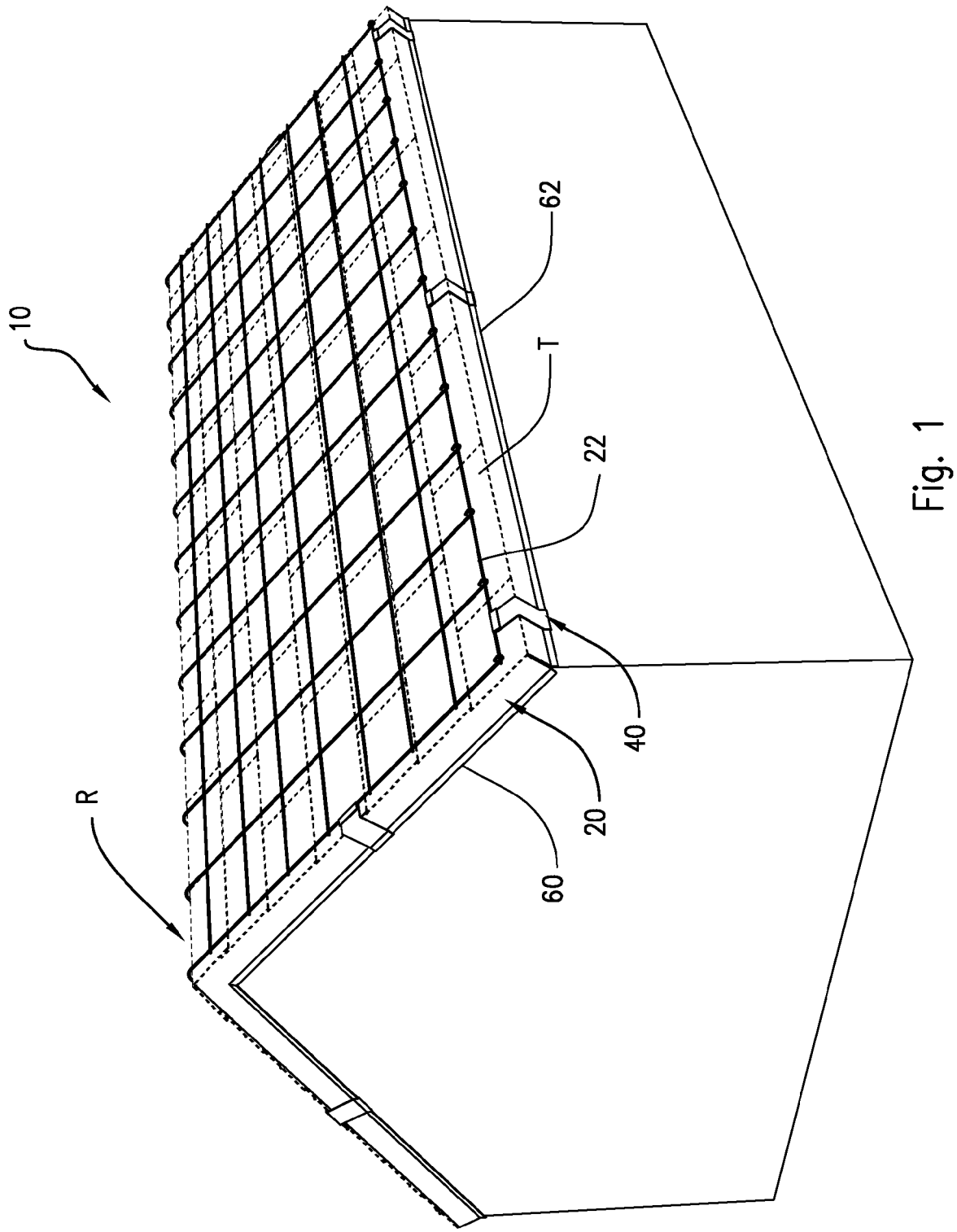
FIG. 1 represents an isometric view of a building structure utilizing one of the embodiments for the present invention.
Figure 2:
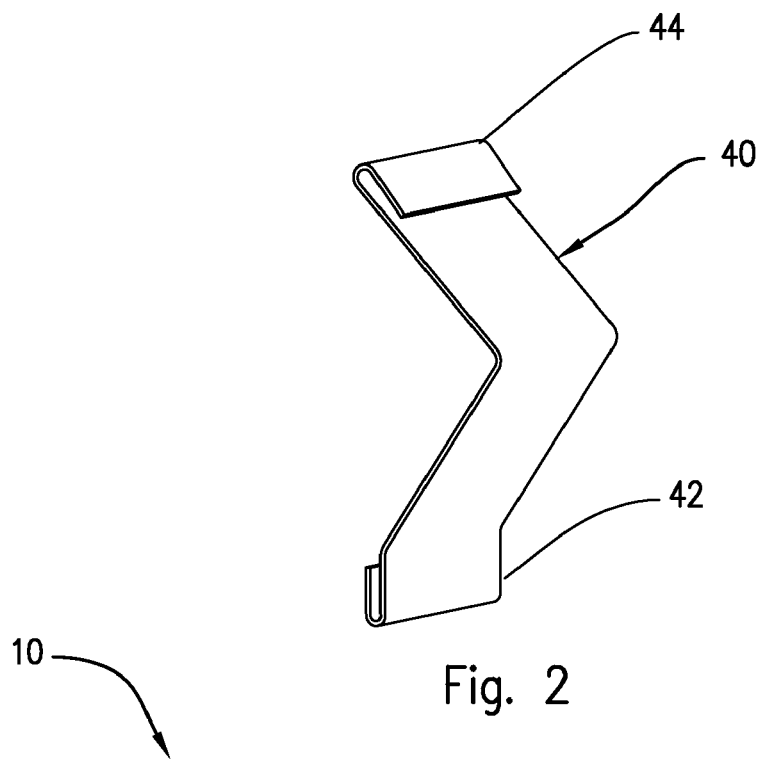
FIG. 2 illustrates an enlarged view of securing strap 40.
Figure 3:
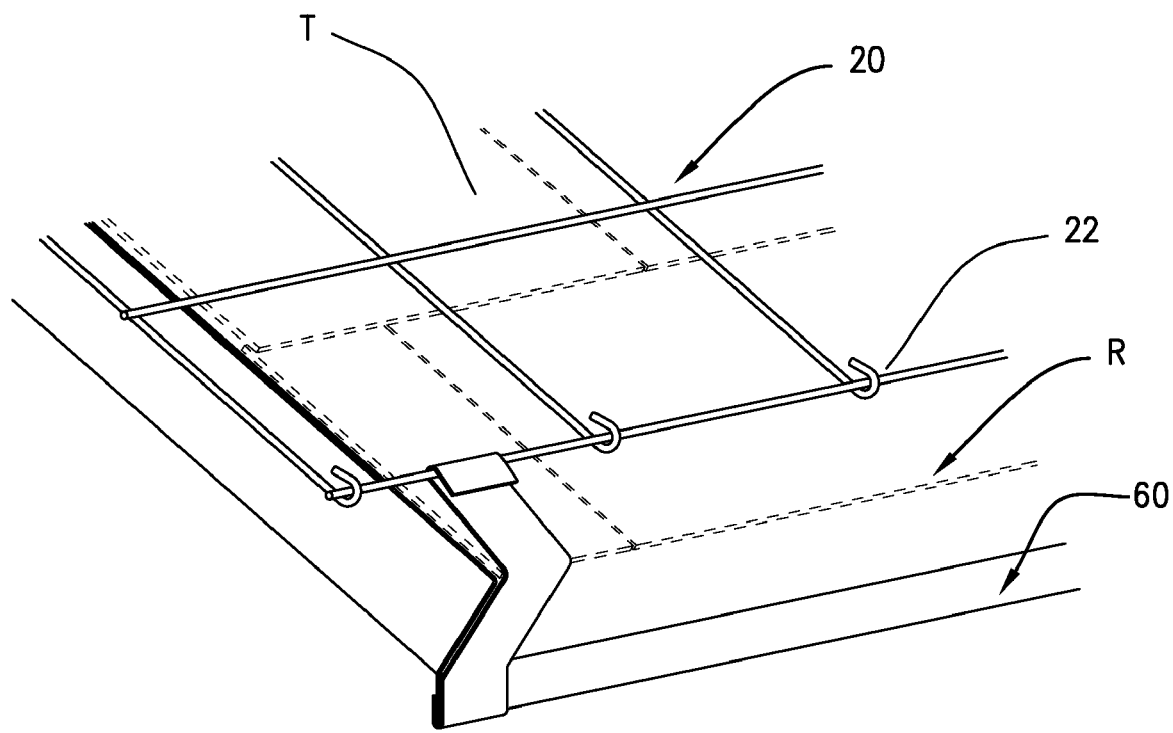
FIG. 3 shows an enlarged isometric view of a portion of FIG. 1 illustrating the means by which wire mesh holding assembly 20 is mounted to a roof.
Figure 4:
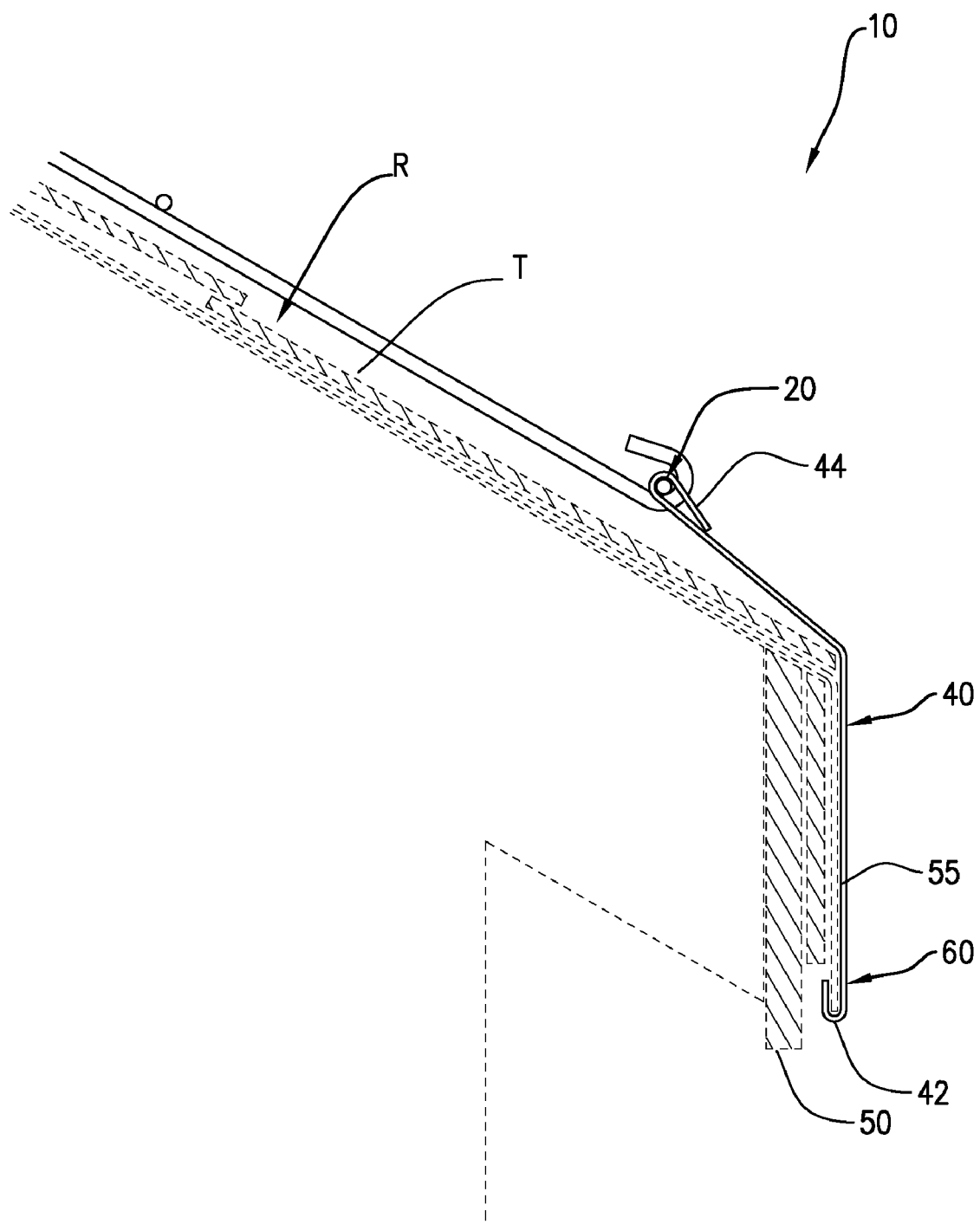
FIG. 4 shows an enlarged cross-sectional side view illustrating the engagement of securing straps 40 to wire mesh holding assembly 20 and drip guard 60.

Referring now to the drawings, where the present invention is generally referred to with numeral 10, it can be observed that it includes wire mesh holding assembly 20 and securing straps 40. In a typical shingle tile roof, an edge is defined at the distal sides of the overhang. The fascia board 50 and nailer strip 55 provides the necessary structure for the attachment of drip guard 60 covering the former. Strap 40 is removably mounted, at one end, to the outermost wire member 22. The other end of strap 40 is removably mounted to drip guard 60.

In FIG. 1, a shingle tile roof structure R is shown. Structure R includes fascia board 50 and nailer strip 55 at the outermost end of the overhang. Drip guard 60 is mounted therein and extends downwardly on one side and upwardly below shingle tile T. The distal side 62 that extends downwardly extends beyond nailer strip 55. Drip guard 60 is made out of metal, such as galvanized sheet metal or aluminum.

Several straps 40 are removably mounted to the outermost wire element 22 of wire mesh 20 on one end 44. End 44 has a hook shape. The other end 42 of strap 40 also has a hook shape to cooperatively engage distal side 62. Straps 40 are deformable to conform to the physical characteristics of the roof structure. The fold on end 42 snuggly receives distal side 62 to transmit the pulling force exerted on wire mesh assembly 20 as compression load primarily.

To deploy protector system 10 over a shingle tile roof structure, wire mesh assembly 20 is placed covering substantially all shingles with the outermost wire member running substantially parallel to the fascia. Straps 40 are mounted to drip guard's distal side 62 first. Outermost wire member 22 is pulled to engage with the fold on end 44 causing wire mesh assembly 20 to exert a force of predetermined magnitude against the shingle tiles. This force is sufficient to withstand selectively high wind conditions since shingle tile loss is typically the first and most common effect of hurricanes.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for shingle tile roof protection, comprising:
   A) a wire mesh assembly with cooperative dimensions to substantially cover a building roof structure with shingle tiles having a drip guard assembly with a peripheral distal side, said wire mesh assembly including a plurality of wire members in criss-cross disposition with an outermost wire member defining the peripheral ends of said wire mesh assembly;
   B) a plurality of strap members each having first and second ends, said first end having a first fold that cooperates to snuggly and removably receive said peripheral distal side of said drip guard assembly to exert a substantially compressive force over said drip guard transmitted by a pulling force exerted on said wire mesh assembly, and said second end having a second fold that is cooperatively and removably mounted to said wire mesh assembly so that said wire mesh assembly is kept in place over said building roof structure preventing the lifting of said shingle tiles, wherein said first folds snuggly receive said drip guard to exert a substantially compressive force over said drip guard.

2. The system set forth in claim 1 wherein said straps are sufficiently deformable to conform to the physical characteristics of said building structure.

* * * * *